Dec. 1, 1970  J. K. SHANNON  3,544,953
PROTECTIVE COVER
Filed Jan. 21, 1969
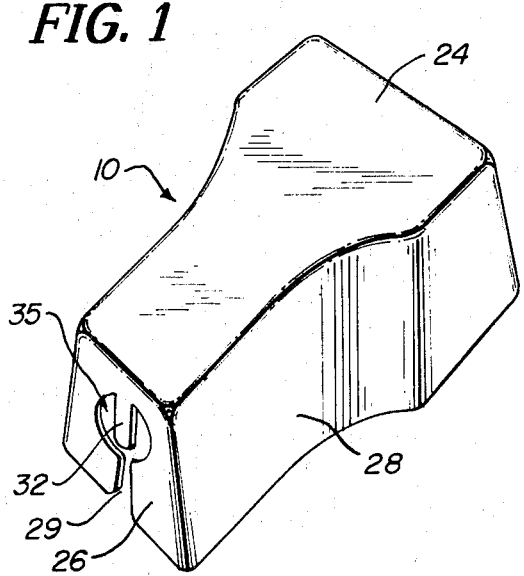
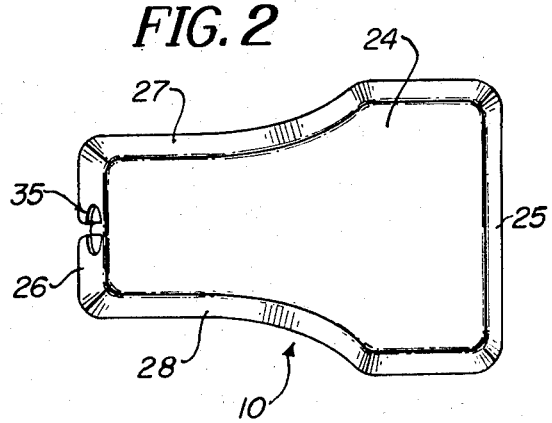
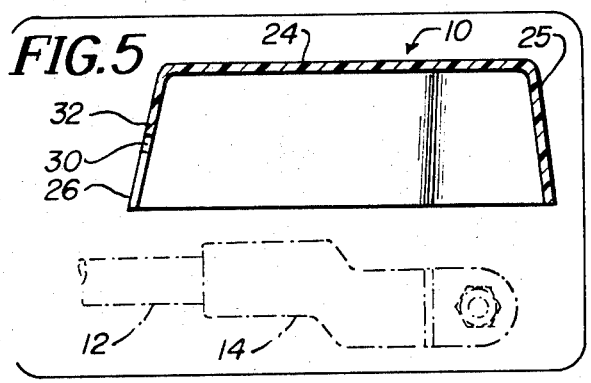
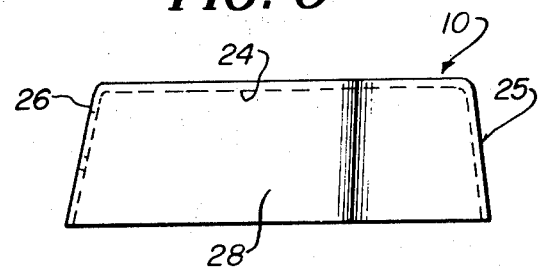
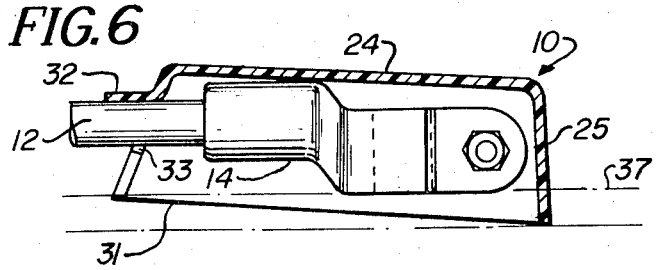
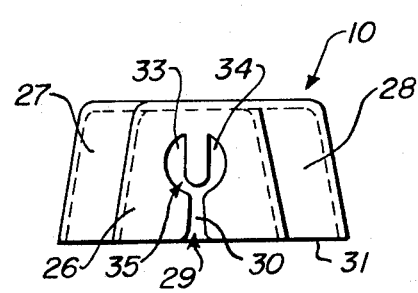
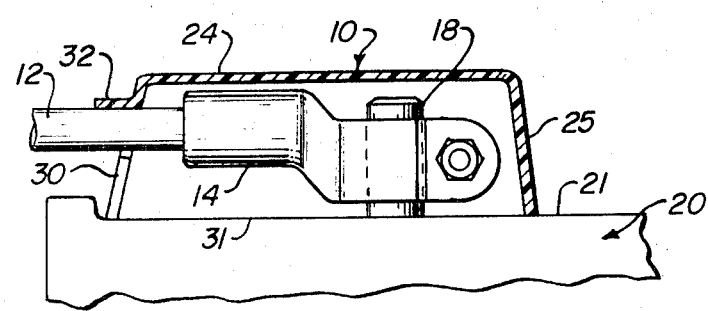
INVENTOR
John K. Shannon
BY
Dominik, Knechtel & Godula
Attys.

United States Patent Office 3,544,953
Patented Dec. 1, 1970

3,544,953
PROTECTIVE COVER
John K. Shannon, 6504 43rd Ave.,
Kenosha, Wis. 53140
Filed Jan. 21, 1969, Ser. No. 792,423
Int. Cl. H01r 3/02
U.S. Cl. 339—116
4 Claims

ABSTRACT OF THE DISCLOSURE

A protective cover for protecting a battery terminal connector affixed to the one end of a battery cable and the battery terminal post to which the connector is affixed from exposure to elements that tend to cause them to corrode. One wall of the protective cover is provided with a Y-shaped slot to receive the battery cable, the central finger of the Y-shaped slot bearing against the battery cable when the cable is forced into the slot to cause the protective cover to tip forward and maintain a tight seal with the top surface of the battery.

---

This invention relates, in general, to protective covers and, in particular, to protective covers for battery terminal connectors for protecting them and the battery terminal post to which they are affixed against corrosion.

It is well-known that battery terminal posts and the battery terminal connectors used to electrically connect battery cables to them tend to corrode when left exposed to the atmosphere. It also is well-known that this corrosion deleteriously affects the electrical operation of the battery and, in extreme cases, can destroy or cause the severance of the connection between the battery cable and the battery terminal connector. Accordingly, care must be taken to remove this corrosion or, preferably, to prevent it from occurring.

Many different types of protective covers have been devised for this latter purpose, however, all of them have been generally unsatisfactory, for one reason or another. For example, in many cases these protective covers are too difficult to affix to or remove from the battery terminal connectors, hence their use is discouraged rather than encouraged. Others are relatively simple to affix to the battery terminal connector, but by the same token, they are so easily removed that they fall off and are lost. Also, most, if not all, of the presently available protective covers fail to form a good seal with the top of a battery so that they actually provide very little protection from the elements.

Accordingly, it is an object of the present invention to provide an improved protective cover for battery terminal connectors, for protecting them and the battery terminal posts to which they are affixed against corrosion.

Another object is to provide protective covers of the above type which can be inexpensively molded.

Still another object is to provide improved protective covers of the above type which are adapted to be easily releasably locked to a battery cable to prevent them from being lost.

A still further object is to provide improved protective covers of the above type which are formed in a fashion such that once affixed to a battery cable, they are constantly forcibly urged or maintained in sealing engagement with the top of a battery, so as to provide a good seal to protect the battery terminal clamp and terminal post from the elements.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawing in which:

FIG. 1 is a perspective view of a protective cover exemplary of the invention;

FIG. 2 is a top plan view of the protective cover of FIG. 1;

FIG. 3 is a side plan view of the protective cover of FIG. 1;

FIG. 4 is a rear end view of the protective cover of FIG. 1;

FIG. 5 is a sectional view of the protective cover, generally illustrating the manner in which it is affixed to a battery cable to cover the battery terminal connector;

FIG. 6 is a sectional view of the protective cover, generally illustrating the manner in which the depending finger functions to forcibly urge the protective cover to tip forward so that its forward edge normally is disposed beneath the lower edge plane of the battery terminal connector; and FIG. 7 is a sectional view of the protective cover, generally illustrating the manner in which it is forcibly urged into sealing engagement with the top of a battery when the battery terminal connector is affixed to a terminal post.

Similar reference characters refer to similar parts throughout the several views of the drawing.

Referring now to the drawing, in FIGS. 5–7 there is illustrated a battery cable 12 having a battery terminal connector 14 affixed to its one end, which connector, in turn, is affixed to a terminal post 18 of a battery 20. The battery terminal connector 14 and the terminal post 18 both are protected from air, dirt, acid, oil and other materials which tend to cause them to corrode, by means of the protective cover 10.

The protective cover 10 is molded as an integral unit of a non-corrosive material such as plastic, preferably polyethylene, so that it can be inexpensively fabricated or formed, is lightweight and is resilient so as to function in the manner described below to sealingly engage its lower edges with the top wall 21 of the battery 20. The protective cover 10 has a top wall 24, a front wall 25, a rear wall 26 and two side walls 27 and 28, all of which are shaped to generally correspond to the outline of the battery terminal connector 14 and to receive the latter therein. It may be noted that all of the walls, except for the rear wall 26, are solid walls and are joined together to form a closed, hollow interior. The rear wall 26, as can be best seen in FIGS. 1 and 4, has a generally Y-shaped slot 29 in it which forms a slot 30 extending upwardly from its lower edge 31 and a downwardly depending finger 32. The edges of the two arms 33 and 34 of the Y-shaped slot 29 are arcuately shaped so as to form an aperture 35 shaped so as to receive the battery terminal cable 12. The diameter of this aperture 35 preferably is equal to or just slightly smaller than the diameter of the battery cable so that the latter is tightly gripped between the edges of the arms 33 and 34. In this fashion, the protective cover 10 is lockingly affixed to the battery cable and as much as possible of the rear wall 26 is sealed against the admission of any substance which tends to cause the battery terminal connector 14 and/or terminal post 18 to corrode. For this latter reason also, the slot 30 preferably is made just large enough to permit the battery cable 12 to be slidingly fitted into the aperture 35.

In placing the protective cover 10 over the battery terminal connector 14, the battery cable 12 is passed through the slot 30 and slidingly fitted into the aperture 35 formed by the two arms 33 and 34. During this operation, the finger 32 is caused to bend outwardly away from the interior of the protective cover 10, so that it engages and lies atop the battery cable 12, as illustrated in FIG. 6. In this position, it can be seen that the finger 32, because of its resiliency, causes the protective cover 10 to tip forward so that its front edge normally is disposed below the plane, indicated by the dot-dash line 37 (FIG. 6), of the lower surface of the battery terminal connector 14. Accordingly, when the battery terminal connector 14 is affixed to the terminal post 18, it can be seen that the front edge of the protective cover 10 is forced upwardly against the biasing action of the finger 32. The finger 32 therefore forcibly urges the protective cover in a fashion such that its lower edges are maintained in sealing engagement with the top surface of the battery. Accordingly, a good seal always is established to prevent the battery terminal connector and/or terminal post from being exposed to any air or other material which tends to cause them to corrode.

From the above description, it can be seen that the protective cover 10 satisfies all of the objectives set forth above, and that it can be easily and inexpensively molded of a non-corrosive material such as plastic, preferably polyethylene. Also, the protective cover is formed in a fashion such that it can be easily and securely lockingly affixed to the battery cable to which the terminal connector that it is to protect is secured to prevent it from being lost. Furthermore, the lower edges of the protective cover are constantly forcibly urged into sealing engagement with the battery top so as to provide a good seal between the battery and the protective cover.

It will thus be seen that the objects set forth above, among those made apparent from the preceding description, are efficiently attained and certain changes may be made in the above product. Accordingly, it is intended that all matter contained in the above description (or shown in the accompanying drawing) shall be interpreted as illustrative and not in a limiting sense.

Now that the invention has been described, what is claimed as new and desired to be secured by Letters Patent is:

1. A protective cover for protecting a battery terminal connector affixed to one end of a battery cable and the battery terminal post to which the connector is affixed from exposure to elements that tend to cause them to corrode, said protective cover being formed of a generally resilient, non-corrosive material and having a top wall, a front wall, a rear wall and side walls all of which are formed to generally correspond to the outline of said battery terminal connector and to receive the latter therein, said rear wall having a generally Y-shaped slot formed in it extending from its lower edge, the two arms of said Y-shaped slot being formed to provide an aperture for receiving the battery cable to which said battery terminal connector is affixed and a finger which depends downwardly into said aperture, said finger bearing against said battery cable and forcibly urging said protective cover to tip forward, whereby said protective cover is caused to be forcibly urged into sealing engagement with the top surface of the battery when said battery terminal connector is affixed to the battery's terminal post to provide and maintain a good seal between the lower edges of said protective cover and the top surface of the battery.

2. The protective cover of claim 1, wherein said aperture is of a size so as to releasably lock said protective cover to said battery cable.

3. The protective cover of claim 1, being molded of a resiilent plastic.

4. The protective cover of claim 3, wherein said plastic is polyethylene.

References Cited

UNITED STATES PATENTS

| 1,858,748 | 5/1932 | Paradis et al. | 339—116 |
| 1,931,949 | 10/1933 | Lockyer | 339—116 |
| 3,307,140 | 2/1967 | Vallinotto et al. | 339—116 X |

ERNEST R. PURSER, Primary Examiner